Sept. 20, 1938. C. W. HARROLD Re. 20,862

SHEET FEEDER

Original Filed Nov. 19, 1930 2 Sheets-Sheet 1

Inventor
CHARLES W. HARROLD
By His Attorney
Philip B. Rice

Sept. 20, 1938. C. W. HARROLD Re. 20,862

SHEET FEEDER

Original Filed Nov. 19, 1930 2 Sheets-Sheet 2

Inventor
CHARLES W. HARROLD
By His Attorney
Philip B. Peck

Reissued Sept. 20, 1938

Re. 20,862

UNITED STATES PATENT OFFICE 20,862

SHEET-FEEDER

Charles W. Harrold, University Heights, Ohio, assignor to Harris-Seybold-Potter Company, Cleveland, Ohio, a corporation of Delaware Original No. 1,920,388, dated August 1, 1933, Serial No. 496,616, November 19, 1930. Application for reissue May 27, 1937, Serial No. 145,067

46 Claims. (Cl. 271—30)

My invention relates to sheet separating and advancing mechanisms for automatic sheet-feeders, and more particularly to suction sheet-separating devices in front edge feeders especially when equipped for use in the pile sheet-feeders of the type shown in the U. S. Charles G. Harris Patent No. 1,112,609 of October 6, 1914.

The objects of my invention are, among other things to provide an improved and simplified front edge feeder of the suction type which embodies a series of oscillating suckers that engage and raise slightly the front edge of the top sheet on a pile and draw same forwardly to the feed-rolls of the printing press or other machine to which the sheet-feeder is attached. After the sheet has been seized by the feed-rolls, the suckers are swung forwardly in unison and drop beneath the plane of the advancing sheet and the sheet moves forwardly into the bite of a second pair of feed-rolls and is further advanced forwardly into the press. When the suckers are retracted to engage the next sheet they pass below the first sheet that is being forwarded with the first pair of feed-rolls lifted out of the way of the returning suckers.

With these and other objects in view, my invention comprises the constructions and operating parts forming the sheet-feeder herein shown and hereinafter to be described as a preferred embodiment of my invention which is also readily adapted to any form of pile-feeder and is not to be restricted to the type shown in the C. G. Harris Patent No. 1,112,609 issued as aforesaid.

Figure 1:
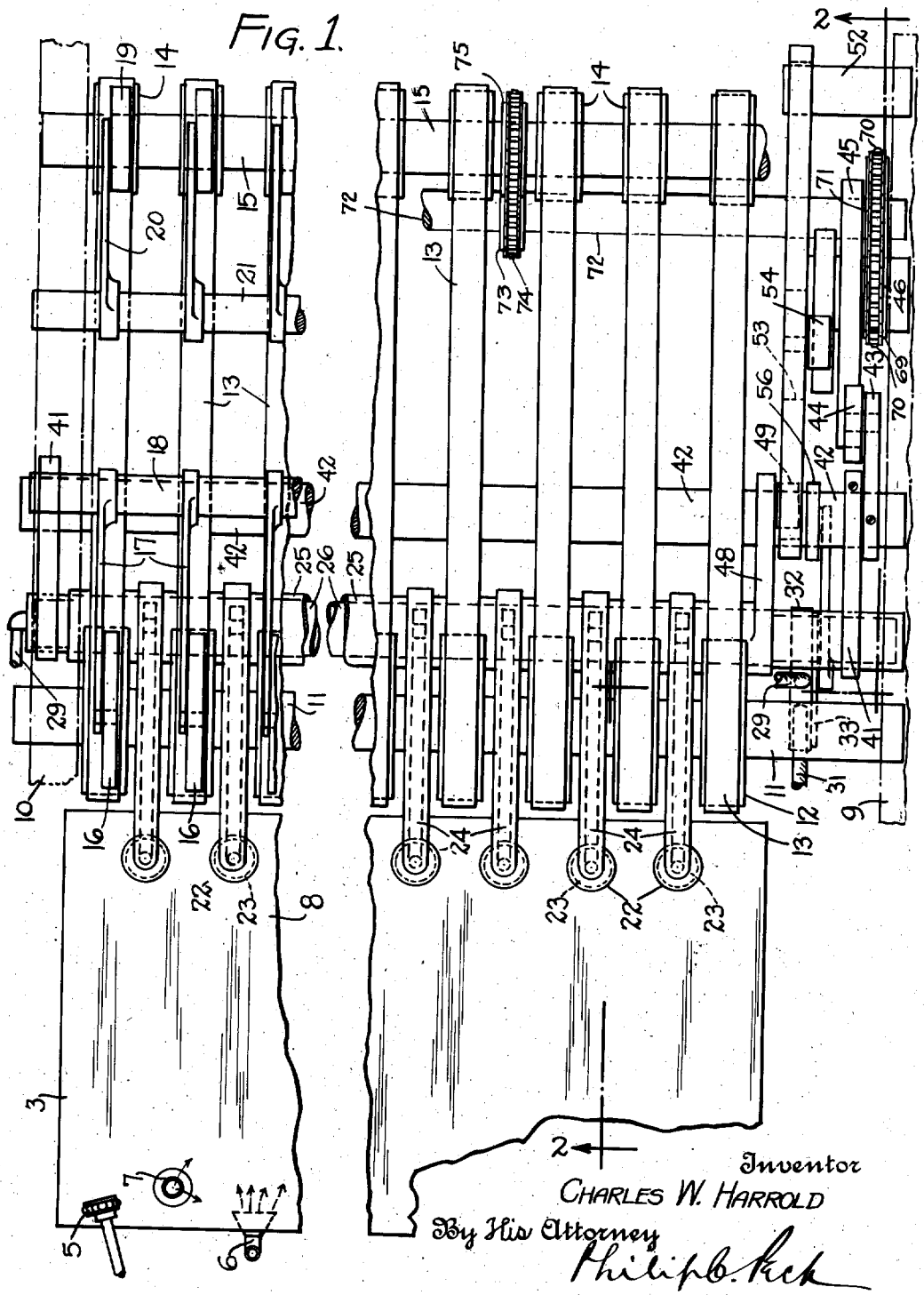

In the drawings, Fig. 1 is a top plan view of my improved feeder; and

Figure 2:
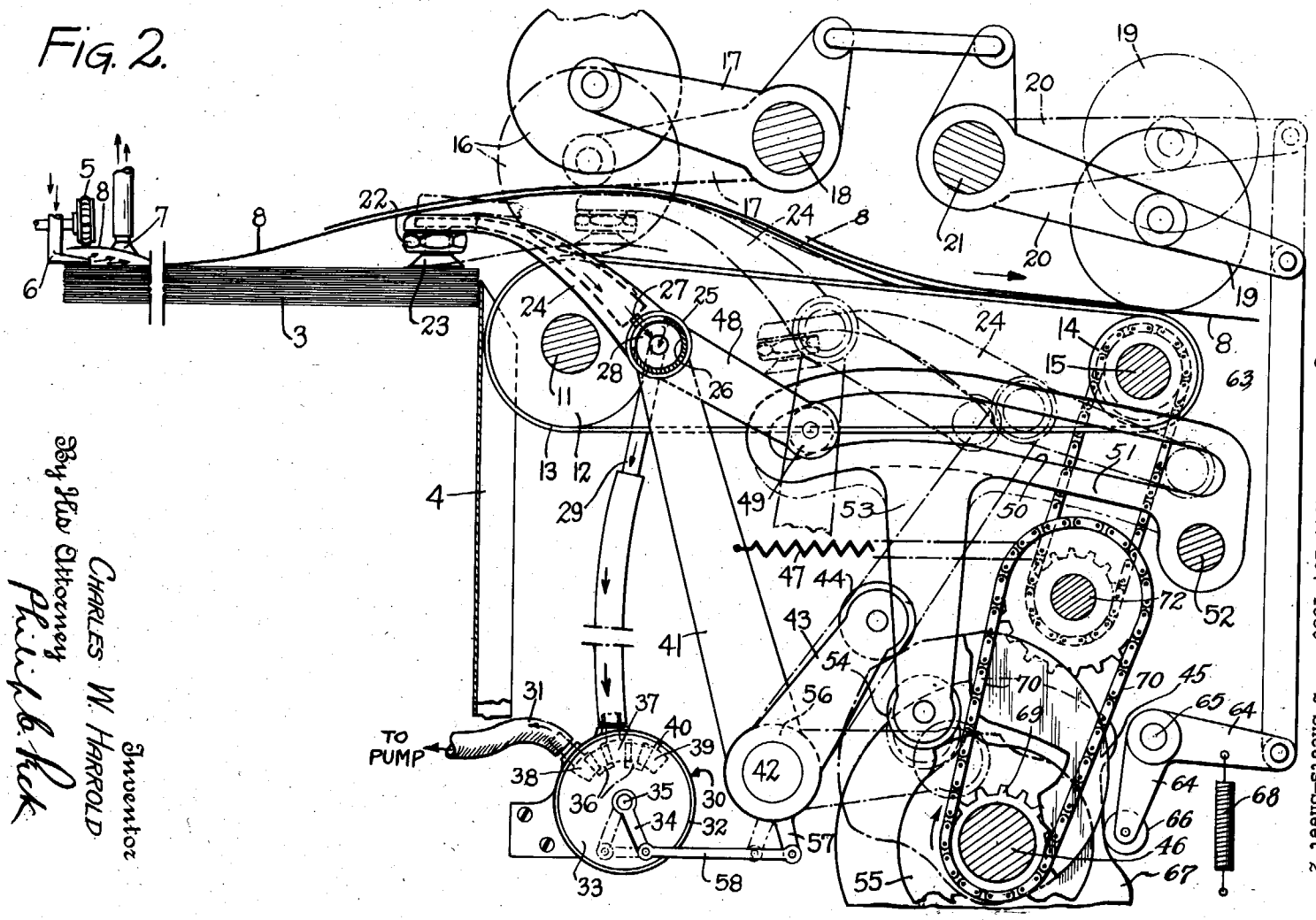

Fig. 2 is a sectional elevation taken on the line 2—2 of Fig. 1.

Similar numerals refer to similar parts throughout the several figures.

Referring to the drawings, the pile of paper 3 is supported on the standards 4, and at each of the rear corners of the pile 3 is located the combing buckler and sheet separating unit (only one being shown), as more particularly shown and described in the C. G. Harris Patent No. 1,112,609, comprising the combing buckler wheel 5 which is rotated to frictionally engage the top portion of the pile 3 at its rear corners to produce a series of traveling arcs or buckles in the topmost and subjacent sheets, the sheets being held against bodily movement by the adjacent presser-foot 6. While the paper buckles are so held by the buckler wheel 5 and presser-foot 6, the suction separator 7 corresponding to the suction separators 5 in the patent to Harris 1,112,609 is lowered to seize the topmost sheet 8, and is then raised with the sheet 8 after which the buckler wheel 5 is lifted (Fig. 2) and the presser-foot 6 is thrown outwardly and then inwardly again to engage the pile 3 beneath the top sheet 8, and simultaneously blasts of air are projected beneath the sheet 8 whereby it is "winded" from the pile 3 to allow my improved front edge feeder mechanisms to seize the top sheet 8 and advance same forwardly (to the right in Fig. 2).

The side-frames 9 and 10 carry the rotatable cross-shaft 11 on which are fixed spaced-apart pulleys 12 around which pulleys 12 pass the looped travelling feed-tapes 13 that also encircle the forward series of spaced-apart pulleys 14 mounted on the shaft 15 journalled in the side-frames 9 and 10. Coacting with pulleys 12 and tapes 13 are a like series of drop-rolls 16 pivoted on the arms 17 affixed to the rock-shaft 18, and a similar set of drop-rolls 19 pivoted to the arms 20 which are affixed to the rock shaft 21 coact with the pulleys 14 and feed-tapes 13. The drop-rolls 16 and 19 are raised and lowered by the following mechanism: Fastened to the shaft 18 is the rock-arm 59 connected by the link 60 to the rock-arm 61 affixed to the rock-shaft 21. Pinned to the extension 62 of one of the arms 20 is the link 63 pivoted to the rock-lever 64 journalled on the stud 65 and carrying the cam-roller 66 that rides on the cam 67 affixed to the cam-shaft 46 by the force of the pull-spring 68. As the cam 67 revolves and the roller 66 rides out of the drop of the cam 67, the drop-rolls 16 are lowered to their dotted line position to engage the sheet while the drop-rolls 19 are raised. When the roller 66 enters the drop of the cam 67 a reverse complementary movement of the rolls 16 and 19 takes place. In the drawings the rolls 19 are shown to have a reciprocating movement, but, if so desired, they may serve as continuous advancing rolls always in contact with the tapes 13 as shown in full lines in Fig. 2.

The row of suction heads 22 (six being shown in Fig. 1) are similar in structure and operation and a description of one such head 22 will suffice for all. The head 22 is hollow and carries the usual rubber sucker lips 23 which engage and attach themselves to the top sheets when an exhaust or vacuum pressure exists in the head 22. The heads 22 are mounted on the ends of hollow arms 24 spaced between the pulleys 12 (Fig. 1) and affixed to the tubular shaft 25 rotatably sleeved over the inner hollow shaft 26. The port 27 in the shaft 25 is adapted to register with the slot 28 in the shaft 26 to provide a suction passage from the interior of the shaft 26 to the suction heads 22. The end of the shaft 26 is connected by the pipe or hose 29 to the valve box 30 which is connected by the hose 31 to the customary vacuum pump (not shown).

The valve box 30 comprises the inner chamber 37 cut out of the circular back plate 32 suitably affixed to the feeder as shown in Fig. 2. Fitted to the plate 32 is the oscillating plate 33 which carries the rock arm 34 on the stud 35 affixed to the plate 33. The plate 33 has the cut-out passage 36 which registers with the cut-out slots 37 and 38 to provide a direct connection with the hose 29 and hose 31 respectively when the rock arm 34 and plate 33 are in the full line position shown in Fig. 2. When the rock-arm 34 is shifted clockwise to its dotted line position the cut-out passage 36 in the plate 33 registers with the slot 37 and chamber 39 which has the vent 40 to atmosphere thereby shutting off the pump from the hose 29 and breaking the suction or exhaust pressure in the suction heads 22. Any other type of device for intermitting the suction derived from the usual vacuum pump in the suction heads 22 may be employed. The present embodiment is shown because of its simplicity in structure and operation.

The hollow shaft 26 is pivotally mounted at either end on the rock arms 41 affixed to the rock-shaft 42 journalled in the side-frames 9 and 10 (Fig. 1). Affixed to the shaft 42 is the arm 43 carrying the cam-roller 44 that coacts with the cam 45 mounted on the cam-shaft 46 which is rotated in the direction of the arrow (Fig. 2) by any suitable means (not shown). The spring 47 between the rock arm 41 and any convenient fixed part of the feeder (not shown) holds the cam-roller 44 on the cam 45 as the latter revolves in a clockwise direction.

The outer tubular shaft 25 on which the sucker arms 24 are mounted carries the arm 48 to which is pinned the cam-roller 49 that engages the cam-slot 50 cut in the elongated oscillating bracket 51 pivoted at one end of the stud 52.

The bracket 51 carries the depending arm 53 to which is pinned the cam-roller 54 that engages the cam 55 mounted on the cam-shaft 46 to impart an up-and-down movement to the bracket 51 as indicated in dotted lines in Fig. 2. The collar 56 affixed to the rock-shaft 42 carries the arm 57 connected by the link 58 to rock-arm 34 to intermit the suction as hereinbefore described in timed relation with the forward and backward swinging movement of the suction heads 22. The proper driving speed relation between the drive cam-shaft 46 that operates the suction heads 22 and the rotating shaft 15 that actuates the travelling feed-tapes 13 so that the suction heads 22 will oscillate at all times beneath the previously fed-off sheets is maintained by the following mechanism: The cam-shaft 46 carries the sprocket 69 around which passes the endless drive chain 70 engaging and driving the large sprocket 71 fast to the cross-shaft 72 journalled in the side-frames 9 and 10. The shaft 72 has also affixed thereto the small sprocket 73 around which passes the endless chain 74 that engages and drives the sprocket 75 fastened to the feed-tape shaft 15. By this mechanism the top sheets 8 are so advanced by the feed-tapes 13 and associated devices that the suction heads 22 will be actuated at all times beneath the previously fed-off sheets moving to the right in Fig. 2 as indicated by the arrow.

The operation of my front-edge sheet-feeder is substantially as follows: When the combing wheel 6 and suction separator 7 have lifted to loosen and raise the rear corners of the top sheet 8 on the pile 3 as shown in Fig. 2, the row of suction heads 22 on their supporting arms 24 are in their full line sheet-engaging position with the rock-arm 41 in its retracted position and the cam-roller 49 in the left end of the cam-slot 50, the cams 45 and 55 having been set on the cam-shaft 46 relatively to each other as shown in full lines in Fig. 2. The collar 56 has also been set on the rock shaft 42 so that the rock arm 34 which controls the suction from the pump through the valve-box 30 is in its full line position to afford a direct exhaust pressure or suction in the suction heads 22 arranged across the front margin of the pile 3. The sucker lips 23 engage and seize the top sheet 8 and lift same slightly; then as the arm 41 swings forwardly as the rock-shaft 42 moves clockwise, the suction heads 22 carry the front edge of the sheet 8 into the bite of the upraised feed-rolls 16 (shown by dotted lines in Fig. 2); at the time the suction heads 22 start on their forward movement suction is broken in the separator 7 and the blast through the presser-foot 6 is discontinued, as described at page 7, lines 68 et seq. of the Harris Patent 1,112,609, referred to above, and then the rolls 16 are lowered by the cam roller 66 riding out of the drop of the cam 67 to press the front portion of the sheet against the travelling feed-tapes 13 at which time the rock arm 34 is shifted to its dotted line position to shut off the suction from the suction heads 22 to release the sheet 8 by venting the heads 22 to atmosphere through the vent 40.

As the rock arm 41 continues to swing forwardly with an accelerated movement, the suction heads 22 and hollow arms 24 are advanced beyond the leading edge of the sheet 8 and are drawn downwardly beneath the plane of the upper run of the feed-tapes 13 through the downward movement of the bracket 51 as the cam-roller 49 is travelling toward the forward end of the cam-slot 50 as shown in Fig. 2. The sheet 8 is now advanced by the feed-tapes 13 into the bite of the second pair of feed-rolls 14 and 19 and so forwarded to the press, while the suction heads 22 are retracted beneath the rear portion of the sheet to their sheet-engaging position over the pile 3 for the next cycle with the feed-rolls 16 lifted out of the way of the retracting suction heads. Such underlapped sheets as they are fed forwardly serve to aid in advancing the superposed sheet so that the successive sheets are carried at an equalized rate of speed through the feeder before reaching the usual side-registering mechanisms and front gages of the press.

While the foregoing sets forth the embodiment of my invention, many changes in the structural details may be made without departing from the principles and scope of the invention or sacrificing the chief advantages obtainable for its use in separating and advancing successive sheets from a pile.

I claim as my invention:

1. In a sheet-feeder, sheet-forwarding means and suction means for separating and advancing a sheet from a pile to said forwarding means, said suction means being moved forwardly and downwardly beneath the sheet when said sheet is under control of said forwarding means.

2. In a sheet-feeder, sheet-forwarding means, suction means for separating and advancing a sheet from a pile having an orbital path to advance the sheet to said forwarding means, and means to move said suction means forwardly and downwardly beneath the sheet when said sheet is under control of said forwarding means.

3. In a sheet-feeder, sheet-forwarding means, suction means for separating and advancing a sheet from a pile having an orbital path in a substantially vertical plane to advance the sheet to said forwarding means, and means to intermit the suction and lower said suction means beneath the sheet when the latter is under control of said forwarding means.

4. In a sheet-feeder, sheet-forwarding means and suction means for separating and advancing a sheet from a pile to said forwarding means, said suction means being moved forwardly and downwardly beneath the sheet after releasing said sheet when under control of said forwarding means.

5. In a sheet-feeder, sheet-forwarding means, suction means for separating and advancing a sheet from a pile to said forwarding means, means to move said suction means forwardly and downwardly beneath the sheet when under control of said forwarding means, and means to retract said suction means to the pile while the sheet is being forwarded.

6. In a sheet-feeder, an oscillatable suction means for separating and advancing a sheet from a pile, said means being moved forwardly and downwardly beneath the advancing sheet during the end of its forward stroke.

7. In a sheet-feeder, an oscillatable suction means for separating and advancing a sheet from a pile, said means being moved forwardly and downwardly beneath the advancing sheet during the end of its forward stroke and retracted to the pile while the sheet is being forwarded.

8. In a sheet-feeder, feed-rolls for forwarding a sheet and an oscillatable suction means for separating and advancing a sheet from a pile to said rolls, said means being moved forwardly and downwardly beneath the advancing sheet during the end of its forward stroke.

9. In a sheet-feeder, feed-rolls for forwarding a sheet and an oscillatable suction means for separating and advancing a sheet from a pile to said rolls, said means being moved forwardly and downwardly beneath the advancing sheet during the end of its forward stroke and retracted to the pile while the sheet is being forwarded.

10. In a sheet-feeder, coacting feed-rolls to forward a sheet one of said rolls having a bodily movement away from the other, suction means for separating and feeding a sheet from a pile between said rolls when separated, means to bring said rolls into operative engagement with the sheet, and means to move said suction means forwardly and downwardly beneath the sheet when carried by said rolls.

11. In a sheet-feeder, coacting feed-rolls to forward a sheet one of said rolls having a bodily movement away from the other, suction means for separating and feeding a sheet from a pile between said rolls when separated, means to bring said rolls into operated engagement with the sheet, means to move said suction means forwardly and downwardly beneath the sheet when carried by said rolls, and means for separating said rolls when said suction means are retracted to the pile.

12. In a sheet-feeder, intermittently separable feed-rolls to forward a sheet when said rolls are in coacting engagement therewith, and an oscillatable suction means for separating and advancing a sheet from a pile to said feed-rolls, said rolls being separated when said suction means is moving through the zone of the rolls and said rolls being closed in engagement with the sheet and having it under control at the instant said sheet is released by the suction means.

13. In a sheet feeder, intermittently separable feed-rolls to forward a sheet when said rolls are in coacting engagement therewith, an oscillatable suction means for separating and feeding a sheet from a pile to the feed rolls, said rolls being separated when said suction means is moving through the zone of the rolls and said rolls being closed in engagement with the sheet and having it under control at the instant said sheet is released by the suction means, and a second pair of feed-rolls for advancing the sheet when the first pair of feed-rolls are separated.

14. In a sheet-feeder, a series of suction heads operating on the front portion of a pile of sheets to separate and advance same, and means for sequentially raising, advancing and then lowering said heads all in a substantially vertical plane beneath the advancing sheet when released from said heads.

15. In a sheet-feeder, a series of suction heads operating on the front portion of a pile of sheets to separate and advance same, sheet-forwarding means to which the sheet is carried by said suction heads, and means for moving said heads forwardly and downwardly beneath the sheet when under control of said sheet-advancing means.

16. In a sheet-feeder, a series of suction heads operating on the front portion of a pile of sheets to separate and advance same, sheet-forwarding means to which the sheet is carried by said suction heads, and means for moving said heads forwardly and downwardly beneath the sheet when under control of said sheet-advancing means and retracting said heads to the pile beneath the advancing sheet.

17. In a sheet feeder, oscillatable suction means for separating and advancing a sheet from a pile and movable in a vertical plane to convey the leading edge of the advancing sheet beneath the preceding fed-off sheet, the suction means moving forwardly of said pile and above and below the top thereof along an orbital path disposed in said vertical plane.

18. In a sheet-feeder, suction means for successively separating and advancing sheets from the top of a pile in underlapped relation, said suction means moving at all times underneath the previously separated sheet along an orbital path extending forwardly of said pile and above and below the top thereof.

19. In a sheet-feeder, sheet forwarding means, suction means for successively separating and advancing sheets from the top of a pile to said forwarding means in underlapped relation, said suction means moving at all times underneath the previously advanced sheet along an orbital path extending forwardly of said pile and above and below the top thereof.

20. In a sheet-feeder, sheet forwarding means, suction means for successively separating, advancing and releasing sheets from the top of a pile to said forwarding means in underlapped relation, said suction means moving at all times underneath the previously advanced and released sheet along an orbital path extending forwardly of said pile and above and below the top thereof.

21. In a device for feeding sheets in lapped relation from a supply of sheets, mechanism for successively feeding sheets from the supply, said mechanism comprising means located adjacent the rear of the supply for separating the sheets one after another from said supply, in combination with means for forwarding the sheets to a printing or other machine and suction means having sheet advancing movement under a previously advanced sheet and adapted to engage separated sheets adjacent the front thereof and advance them in lapped relation to the forwarding means as fast as they are separated from the supply by said separating means, and means for operating said suction sheet engaging and advancing means and including means for releasing the suction sheet engaging and advancing means from each sheet when it has been advanced to and is under the control of said forwarding means.

22. In a device for feeding sheets in lapped relation from a supply of sheets, mechanism for successively feeding sheets from the supply, said mechanism comprising means located adjacent the rear of the supply and including suction sheet lifting means for separating the sheets one after another from said supply, in combination with means for forwarding the sheets to a printing or other machine and suction means having sheet advancing movement under a previously advanced sheet and adapted to engage separated sheets adjacent the front thereof and advance them in lapped relation to the forwarding means as fast as they are separated from the supply by said separating means, and means for operating said suction sheet engaging and advancing means and including means for releasing the suction sheet engaging and advancing means from each sheet when it has been advanced to and is under the control of said forwarding means.

23. In a device for feeding sheets in lapped relation from a supply of sheets, mechanism for successively feeding sheets from the supply, said mechanism comprising means for separating the sheets one after another from the supply and including means for blowing air between each sheet and the supply as said sheet is being separated, in combination with means for forwarding the sheets to a printing or other machine and suction means having sheet advancing movement under a previously advanced sheet and adapted to engage separated sheets and advance them in lapped relation to the forwarding means as fast as they are separated from the supply by said separating means, and means for operating said suction sheet engaging and advancing means and including means for releasing the suction sheet engaging and advancing means from each sheet when it has been advanced to and is under the control of said forwarding means.

24. In a device for feeding sheets in lapped relation from a supply of sheets, mechanism for successively feeding sheets from the supply, said mechanism comprising means for separating the sheets one after another from the supply including means for lifting the sheets, means for blowing air under each sheet lifted, and presser means for temporarily holding from bodily movement those sheets located under the one lifted, in combination with means for forwarding the sheets to a printing or other machine and suction means having sheet advancing movement under a previously advanced sheet and adapted to engage separated sheets and advance them in lapped relation to the forwarding means as fast as they are separated from the supply by said separating means, and means for operating said suction sheet engaging and advancing means and including means for releasing the suction sheet engaging and advancing means from each sheet when it has been advanced to and is under the control of said forwarding means.

25. In a device for feeding sheets in lapped relation from a supply to a printing or other machine, means for forwarding said sheets to the machine, and mechanism for successively feeding sheets from said supply to said forwarding means, said mechanism comprising suction means for separating the sheets one after another from the rear of said supply of sheets, in combination with suction means having sheet advancing movement under a previously advanced sheet and adapted to engage separated sheets and advance them to the forwarding means in lapped relation as fast as they are separated from the supply by said separating means, and means for operating said suction sheet engaging and advancing means and including means for releasing the suction sheet engaging and advancing means from each sheet when it has been advanced to and is under the control of said forwarding means.

26. In a device for feeding sheets in lapped relation from a supply to a printing or other machine, means for forwarding said sheets to the machine, and mechanism for successively feeding sheets from said supply to said forwarding means, said mechanism comprising means located adjacent the rear of the supply for separating the sheets one after another from said supply of sheets, in combination with suction means movable under a previously advanced sheet for engaging succeeding separated sheets adjacent the front thereof and advancing them to the forwarding means in lapped relation as fast as they are separated from the supply by said separating means, and means for operating said suction sheet engaging and advancing means and including means for releasing the suction sheet engaging and advancing means from each sheet when it has been advanced to and is under the control of said forwarding means.

27. In a device for feeding sheets in lapped relation from a pile to a printing or other machine, means for forwarding said sheets to the machine, and mechanism for successively feeding sheets from the pile to said forwarding means, said mechanism comprising means for separating the sheets one after another from the pile of sheets including means for buckling the top-most sheet, suction means for lifting the buckled portion of said sheet, means for engaging and holding the remaining sheets of the pile against movement, and means for blasting said sheet with air, in combination with suction means for engaging the blasted sheet and for advancing the same to the forwarding means in lapped relation with a previously advanced sheet, operating means for said suction sheet engaging and advancing means imparting sheet advancing movement thereto under the previously advanced sheet whereby said blasted sheet is advanced to the forwarding means in lapped relation with the previously advanced sheet as aforesaid, and means for breaking suction in the suction sheet engaging and advancing means when the blasted sheet has been advanced to and is under the control of said forwarding means, the suction in the suction separating means being adapted to be broken and the air blast through the air blasting means adapted to be cut off as the suction sheet engaging and advancing means starts on its forward movement.

28. In a device for feeding sheets in lapped relation from a supply to a printing or other machine, means for forwarding said sheets to the machine, and mechanism for successively feeding sheets from said supply to said forwarding means, said mechanism comprising means located adjacent the rear of the supply for separating the sheets one after another from said supply of sheets, in combination with a plurality of suction devices having sheet advancing movement under a previously advanced sheet and adapted to engage marginal portions of the separated sheets adjacent the front thereof and advance said sheets to the forwarding means in lapped relation as fast as the sheets are separated from the supply by said sheet separating means, and means for operating said suction sheet engaging and advancing devices including means for releasing them from each sheet when it has been advanced to and is under the control of said forwarding means.

29. In a device for feeding sheets in lapped relation from a pile of sheets, mechanism for separating and advancing successive sheets from the pile in lapped relation, said mechanism comprising means for buckling the rear edge of the topmost sheet, suction means for engaging the buckled portion of said sheet and separating the rear portion of the same from the pile, means for engaging and holding the remaining sheets of the pile against movement, and means for blasting said sheet with air to further separate the same from the pile, in combination with means for forwarding the sheets to a printing or other machine and suction means having sheet advancing movement under a previously advanced sheet and adapted to engage the blasted sheet and advance the same to the forwarding means in lapped relation with the previously advanced sheet, the suction in the suction separating means adapted to be rendered operative before the suction in the suction sheet engaging and advancing means is rendered operative, and means for operating said suction sheet engaging and advancing means and including means for releasing the suction sheet engaging and advancing means from each sheet when it has been advanced to and is under the control of said forwarding means, the suction in the suction separating means adapted to be broken and the air blast through the air blasting means adapted to be cut off as the suction sheet engaging and advancing means starts on its forward movement.

30. In a device for feeding sheets in lapped relation from a supply to a printing or other machine in which the means for engaging the sheet separated from the supply and for advancing the same to the forwarding means has sheet advancing movement under the previously advanced sheet, means for forwarding said sheets to the machine, and mechanism for successively feeding sheets from said supply to said forwarding means, said mechanism comprising rearwardly located means for separating the sheets one after another from the top of said supply of sheets, in combination with forwardly located suction means for engaging the top of the separated sheets and advancing said sheets to the forwarding means in lapped relation as fast as they are separated from the supply by said separating means, and operating means for said suction sheet engaging and advancing means imparting sheet advancing movement thereto under a previously advanced sheet and causing the suction sheet engaging and advancing means to release each sheet when it is advanced to and under the control of said forwarding means.

31. In a device for feeding sheets from a supply to a printing or other machine, means for forwarding said sheets to the printing machine, and mechanism for successively feeding sheets from said supply to said forwarding means, the speed of the forwarding means relative to the speed of the feeding mechanism being so correlated that the latter delivers sheets to the former in lapped relation, said mechanism comprising means located adjacent the rear of the supply for separating the sheets one after another from said supply of sheets, in combination with suction means having sheet advancing movement under a previously advanced sheet and adapted to engage separated sheets adjacent the front thereof and advance them to the forwarding means as fast as they are separated from the supply by said separating means, and means for operating said suction sheet advancing means and including means for releasing the suction sheet engaging and advancing means from each sheet when it has been advanced to and is under the control of said forwarding means.

32. In a device for feeding sheets in lapped relation from a supply to a printing or other machine, means for forwarding said sheets to the machine, and mechanism for successively feeding sheets from said supply to said forwarding means, said mechanism comprising means for separating portions of the sheets one after another from the supply and means for blowing air between each sheet thus separated and the supply for completely separating the sheets therefrom, in combination with suction means having sheet advancing movement under a previously advanced sheet and adapted to engage completely separated sheets and advance them to the forwarding means in lapped relation as fast as they are completely separated from the supply, and means for operating said suction sheet advancing means and including means for releasing the suction sheet engaging and advancing means from each sheet when it has been advanced to and is under the control of said forwarding means.

33. In a device for feeding sheets in lapped relation from a supply of sheets, mechanism for successively feeding sheets from the supply, said mechanism comprising means located adjacent the rear of the supply for separating the sheets one after another from said supply, in combination with suction means having sheet advancing movement under a previously advanced sheet and adapted to engage separated sheets adjacent the front thereof and advance them in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

34. In a device for feeding sheets in lapped relation from a supply of sheets, mechanism for successively feeding sheets from the supply, said mechanism comprising means located adjacent the rear of the supply and including suction sheet lifting means for separating the sheets one after another from said supply, in combination with suction means having sheet advancing movement under a previously advanced sheet and adapted to engage separated sheets adjacent the front thereof and advance them in lapped relation as fast as they are separated from the supply by said separating means, and means for operating said suction sheet engaging and advancing means, said sheet lifting and separating means being adapted to engage a succeeding sheet and separate the latter from the supply upon a partial movement, effected by said sheet engaging and advancing means, of the preceding sheet from said supply.

35. In a device for feeding sheets in lapped relation from a supply of sheets, mechanism for successively feeding sheets from the supply, said mechanism comprising means for separating the sheets one after another from the supply and including means for blowing air between each sheet and the supply as said sheet is being separated, in combination with suction means having sheet advancing movement under a previously advanced sheet and adapted to engage separated sheets and advance them in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

36. In a device for feeding sheets in lapped relation from a supply of sheets to a printing or other machine, means for forwarding said sheets to the machine, and mechanism for successively feeding sheets from said supply to said forwarding means, said mechanism comprising means located adjacent the rear of the supply for separating the sheets one after another from said supply, in combination with suction means having sheet advancing movement under a previously advanced sheet and adapted to engage separated sheets adjacent the front thereof and advance them to the forwarding means in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

37. In a device for feeding sheets in lapped relation from a supply of sheets, mechanism for successively feeding sheets from the supply, said mechanism comprising means for separating the sheets one after another from the supply including means for lifting the sheets, means for blowing air under each sheet lifted, and presser means for temporarily holding from bodily movement those sheets located under the one lifted, in combination with suction means having sheet advancing movement under a previously advanced sheet and adapted to engage separated sheets and advance them in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

38. In a device for feeding sheets in lapped relation from a supply to a printing or other machine, means for forwarding said sheets to the machine, and mechanism for successively feeding sheets from said supply to said forwarding means, said mechanism comprising suction means for separating the sheets one after another from the rear of said supply of sheets, in combination with suction means having sheet advancing movement under a previously advanced sheet and adapted to engage separated sheets and advance them to the forwarding means in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

39. In a device for feeding sheets in lapped relation from a supply to a printing or other machine, means for forwarding said sheets to the machine, and mechanism for successively feeding sheets from said supply to said forwarding means, said mechanism comprising means located adjacent the rear of the supply for separating the sheets one after another from said supply of sheets, in combination with suction means movable under a previously advanced sheet for engaging succeeding separated sheets adjacent the front thereof and advancing them to the forwarding means in lapped relation as fast as they are separated from the supply by said separating means, and means for operating said suction sheet engaging and advancing means, said sheet separating means being adapted to engage the succeeding sheet and separate the latter from the supply upon a partial movement, effected by said sheet engaging and advancing means, of the preceding sheet from said supply.

40. In a device for feeding sheets in lapped relation from a pile to a printing or other machine, means for forwarding said sheets to the machine, and mechanism for successively feeding sheets from the pile to said forwarding means, said mechanism comprising means for separating the sheets one after another from the pile of sheets including means for buckling the topmost sheet, suction means for lifting the buckled portion of said sheet, means for engaging and holding the remaining sheets of the pile against movement, and means for blasting said sheet with air, in combination with suction means for engaging the blasted sheet and for advancing the same to the forwarding means in lapped relation with a previously advanced sheet, and operating means for said suction sheet engaging and advancing means imparting sheet advancing movement thereto under the previously advanced sheet whereby said blasted sheet is advanced to the forwarding means in lapped relation with the previously advanced sheet as aforesaid, said sheet separating means being adapted to engage the succeeding sheet and separate the latter from the supply upon a partial movement, effected by said sheet engaging and advancing means, of the preceding sheet from said supply.

41. In a device for feeding sheets in lapped relation from a supply to a printing or other machine, means for forwarding said sheets to the machine, and mechanism for successively feeding sheets from said supply to said forwarding means, said mechanism comprising means located adjacent the front of the supply for separating the sheets one after another from said supply of sheets, in combination with a plurality of suction devices having sheet advancing movement under a previously advanced sheet and adapted to engage marginal portions of the separated sheets adjacent the front thereof and advance said sheets to the forwarding means in lapped relation as fast as the sheets are separated from the supply by said sheet separating means, and means for operating said suction sheet engaging and advancing devices, said sheet separating means being adapted to engage the succeeding sheet and separating the latter from the supply upon a partial movement, effected by said sheet engaging and advancing devices, of the preceding sheet from said supply.

42. In a device for feeding sheets in lapped relation from a pile of sheets, mechanism for separating and advancing successive sheets from the pile in lapped relation, said mechanism comprising means for buckling the rear edge of the topmost sheet, suction means for engaging the buckled portion of said sheet and separating the rear portion of the same from the pile, means for engaging and holding the remaining sheets of the pile against movement, and means for blasting said sheet with air to further separate the same from the pile, in combination with suction means having sheet advancing movement under a previously advanced sheet and adapted to engage the blasted sheet and advance the same in lapped relation with the previously advanced sheet, the suction in the suction separating means being rendered operative before the suction in the suction sheet engaging and advancing means is rendered operative, and means for operating said suction sheet engaging and advancing means, the suction in the suction separating means adapted to be broken and the air blast through the air blasting means adapted to be cut off as the suction sheet engaging and advancing means starts on its forward movement, said sheet separating means being adapted to engage the succeeding sheet and separate the latter from the pile upon a partial movement, effected by said sheet engaging and advancing means, of the preceding sheet from said pile.

43. In a device for feeding sheets in lapped relation from a supply to a printing or other machine in which the means for engaging the sheet separated from the supply and for advancing the same to the forwarding means has sheet advancing movement under the previously advanced sheet, means for forwarding said sheets to the machine, and mechanism for successively feeding sheets from said supply to said forwarding means, said mechanism comprising rearwardly located means for separating the sheets one after another from the top of said supply of sheets, in combination with forwardly located suction means for engaging the top of the separated sheets and advancing said sheets to the forwarding means in lapped relation as fast as they are separated from the supply by said separating means, and operating means for said suction sheet engaging and advancing means imparting sheet advancing movement thereto under a previously advanced sheet whereby said separated sheets are advanced to said forwarding means in lapped relation as aforesaid, said sheet separating means being adapted to engage the succeeding sheet and separate the latter from the supply upon a partial movement, effected by said sheet engaging and advancing means, of the preceding sheet from the supply.

44. In a device for feeding sheets from a supply to a printing or other machine, means for forwarding said sheets to the printing machine, and mechanism for successively feeding sheets from said supply to said forwarding means, the speed of the forwarding means relative to the speed of the feeding mechanism being so correlated that the latter delivers sheets to the former in lapped relation, said mechanism comprising means located adjacent the rear of the supply for separating the sheets one after another from said supply of sheets, in combination with suction means having sheet advancing movement under a previously advanced sheet and adapted to engage separated sheets adjacent the front thereof and advance them to the forwarding means as fast as they are separated from the supply by said separating means, and means for operating said suction sheet advancing means, said sheet separating means being adapted to engage the succeeding sheet and separate the latter from the supply upon a partial movement, effected by said sheet engaging and advancing means, of the preceding sheet from said supply.

45. In a device for feeding sheets in lapped relation from a supply to a printing or other machine, means for forwarding said sheets to the machine, and mechanism for successively feeding sheets from said supply to said forwarding means, said mechanism comprising means for separating portions of the sheets one after another from the supply and means for blowing air between each sheet thus separated and the supply for completely separating the sheets therefrom, in combination with suction means having sheet advancing movement under a previously advanced sheet and adapted to engage completely separated sheets and advance them to the forwarding means in lapped relation as fast as they are completely separated from the supply, and means for operating said suction sheet advancing means, said sheet separating means being adapted to engage the succeeding sheet and separate the latter from the supply upon a partial movement, effected by said suction sheet advancing means, of the preceding sheet from said supply.

46. In a device for feeding sheets in lapped relation from a supply of sheets, mechanism for successively feeding sheets from the supply, said mechanism comprising means located adjacent the rear of the supply for separating the sheets one after another from said supply, in combination with means for forwarding the sheets to a printing or other machine and suction means having sheet advancing movement under a previously advanced sheet and adapted to engage separated sheets adjacent the front thereof and advance them in lapped relation to said forwarding means as fast as they are separated from the supply by said separating means, said sheet separating means being adapted to engage the succeeding sheet and separate the latter from the supply upon a partial movement, effected by said sheet engaging and advancing means, of the preceding sheet from said supply, and means for operating said suction sheet engaging and advancing means including means for releasing the suction sheet engaging and advancing means from each sheet when it has been advanced to and is under the control of said forwarding means.

CHARLES W. HARROLD.